(12) United States Patent
Folting et al.

(10) Patent No.: US 7,162,489 B2
(45) Date of Patent: *Jan. 9, 2007

(54) ANOMALY DETECTION IN DATA PERSPECTIVES

(75) Inventors: Allan Folting, Redmond, WA (US); Bo Thiesson, Woodinville, WA (US); David E. Heckerman, Bellevue, WA (US); David M. Chickering, Bellevue, WA (US); Eric Barber Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/299,539

(22) Filed: Dec. 12, 2005

(65) Prior Publication Data

US 2006/0106560 A1  May 18, 2006

Related U.S. Application Data

(63) Continuation of application No. 10/874,956, filed on Jun. 23, 2004, now Pat. No. 7,065,534.

(51) Int. Cl.
G06F 7/00 (2006.01)
(52) U.S. Cl. ..................................... 707/102
(58) Field of Classification Search ................ 707/102
See application file for complete search history.

(56) References Cited

U.S. PATENT DOCUMENTS

| | | | |
|---|---|---|---|
| 5,998,925 A | 12/1999 | Shimuzu et al. | |
| 6,542,878 B1 | 4/2003 | Heckerman et al. | |
| 2002/0127529 A1 | 9/2002 | Cassuto et al. | |
| 2004/0034616 A1 | 2/2004 | Witkowski et al. | |
| 2004/0181519 A1* | 9/2004 | Anwar | 707/3 |
| 2004/0225648 A1 | 11/2004 | Ransom et al. | |
| 2005/0222928 A1* | 10/2005 | Steier et al. | 705/35 |
| 2005/0283511 A1* | 12/2005 | Fan et al. | 708/306 |

OTHER PUBLICATIONS

Rakesh Agrawal et al., "Intelligent Information Systems", IBM Almaden Research Center, viewed Feb. 18, 2004, 1 page.
Sunita Sarawagi, et al., Discovery-Driven Exploration of OLAP Cubes, Proceedings of the 6th International Conference on Extending Database Technology: Advances in Database Technology, 1998, pp. 168-182, Springer-Verlag, London, UK.

* cited by examiner

*Primary Examiner*—Michael Nghiem
*Assistant Examiner*—Demetrius Pretlow
(74) *Attorney, Agent, or Firm*—Amin, Turocy & Calvin, LLP

(57) ABSTRACT

The present invention leverages curve fitting data techniques to provide automatic detection of data anomalies in a "data tube" from a data perspective, allowing, for example, detection of data anomalies such as on-screen, drill down, and drill across data anomalies in, for example, pivot tables and/or OLAP cubes. It determines if data substantially deviates from a predicted value established by a curve fitting process such as, for example, a piece-wise linear function applied to the data tube. A threshold value can also be employed by the present invention to facilitate in determining a degree of deviation necessary before a data value is considered anomalous. The threshold value can be supplied dynamically and/or statically by a system and/or a user via a user interface. Additionally, the present invention provides an indication to a user of the type and location of a detected anomaly from a top level data perspective.

20 Claims, 7 Drawing Sheets

ANOMALY DETECTION IN DATA PERSPECTIVES

CROSS-REFERENCE TO RELATED APPLICATIONS

This application is a continuation of U.S. patent application Ser. No. 10/874,956, filed Jun. 23, 2004 now U.S. Pat. No. 7,065,534 and entitled, "ANOMALY DETECTION IN DATA PERSPECTIVES." The entirety of the aforementioned application is herein incorporated by reference.

TECHNICAL FIELD

The present invention relates generally to data mining, and more particularly to systems and methods for providing automatic data anomaly detection in data perspectives.

BACKGROUND OF THE INVENTION

Digitizing information allows vast amounts of data to be stored in incredibly small amounts of space. The process, for example, permits the storage of the contents of a library to be captured on a single computer hard drive. This is possible because the data is converted into binary states that can be stored via digital encoding devices onto various types of digital storage media, such as hard drives, CD-ROM disks, and floppy disks. As digital storage technology progresses, the density of the storage devices allows substantially more data to be stored in a given amount of space, the density of the data limited mainly by physics and manufacturing processes.

With increased storage capacity, the challenges of effective data retrieval are also increased, making it paramount that the data be easily accessible. For example, the fact that a library has a book, but cannot locate it, does not help a patron who would like to read the book. Likewise, just digitizing data is not a step forward unless it can be readily accessed. This has led to the creation of data structures that facilitate in efficient data retrieval. These structures are generally known as "databases." A database contains data in a structured format to provide efficient access to the data. Structuring the data storage permits higher efficiencies in retrieving the data than by unstructured data storage. Indexing and other organizational techniques can be applied as well. Relationships between the data can also be stored along with the data, enhancing the data's value.

In the early period of database development, a user would generally view "raw data" or data that is viewed exactly as it was entered into the database. Techniques were eventually developed to allow the data to be formatted, manipulated, and viewed in more efficient manners. This allowed, for instance, a user to apply mathematical operators to the data and even create reports. Business users could access information such as "total sales" from data in the database that contained only individual sales. User interfaces continued to be developed to further facilitate in retrieving and displaying data in a user-friendly format. Users eventually came to appreciate that different views of the data, such as total sales from individual sales, allowed them to obtain additional information from the raw data in the database. This gleaning of additional data is known as "data mining" and produces "meta data" (i.e., data about data). Data mining allows valuable additional information to be extracted from the raw data. This is especially useful in business where information can be found to explain business sales and production output, beyond results solely from the raw input data of a database.

Thus, data manipulation allows crucial information to be extracted from raw data. This manipulation of the data is possible because of the digital nature of the stored data. Vast amounts of digitized data can be viewed from different aspects substantially faster than if attempted by hand. Each new perspective of the data may enable a user to gain additional insight about the data. This is a very powerful concept that can drive businesses to success with it, or to failure without it. Trend analysis, cause and effect analysis, impact studies, and forecasting, for example, can be determined from raw data entered into a database—their value and timeliness predicated by having intuitive, user-friendly access to the digitized information.

Currently, data manipulation to increase data mining capabilities requires substantial user input and knowledge to ensure that erroneous data is not included in various data perspectives. This requires that a user must have intimate knowledge of the data and insight into what types of errors can occur in the data. Without this prior knowledge, a user must try a 'hit and miss' approach, hoping to catch data anomalies buried in a given data perspective. This approach is typically beyond the casual user and/or is too time consuming for an advanced user. The amount of stored data is generally too vast and complex in relationship for a user to efficiently develop a useable strategy to ensure that all data anomalies are uncovered.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to data mining, and more particularly to systems and methods for providing automatic data anomaly detection in data perspectives. Data curve fitting techniques are leveraged to provide automatic detection of data anomalies in a "data tube" from a data perspective; the data tube containing data with only one varying data dimension. This allows, for example, detection of data anomalies such as on-screen, drill down, and drill across data anomalies in, for example, spreadsheet pivot tables and/or On-line Analytical Processing (OLAP) cubes and the like. By providing automatic data perspective analysis, the present invention permits inexperienced users to easily locate erroneous data information from a database. This is achieved by determining if data substantially deviates from a predicted value established by a curve fitting process such as, for example, a piece-wise linear function applied to a data tube. A threshold value can also be employed by the present invention to facilitate in determining a degree of deviation necessary before a data value is considered anomalous. The threshold value can be supplied dynamically and/or statically by, for example, a system and/or a user via a user interface and the like. Additionally, the present invention can readily indicate to a user a type and location of a detected anomaly from a top level data perspective; negating the necessity of a user to hunt for data anomalies at lower levels.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
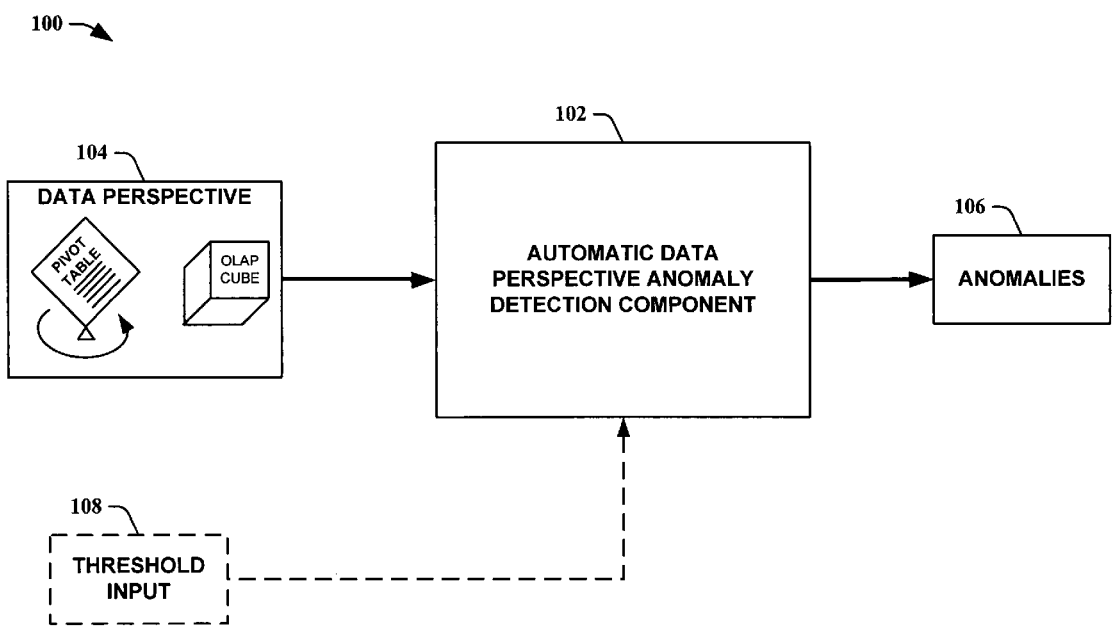
FIG. 1 is a block diagram of an automatic data perspective anomaly detection system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention facilitates analysis of data perspectives by automatically detecting anomalous data. Indicators are utilized to provide a user with notice that a particular data perspective has erroneous data at some level. The level can be, for example, an on-screen or top level and/or a level that is not currently displayed but requires a user to drill down through the data and/or drill across the data to reveal the erroneous data values. In this manner, a user can easily determine that data anomalies exist and how much effort and/or what data view is required to reveal the erroneous data. A user and/or system can also statically and/or dynamically set a threshold value to facilitate in the automatic detection. A user can also select different thresholds for various types of data anomalies. The threshold value determines how substantially a data value must deviate before it is considered anomalous. The deviation is determined by comparing the data value to a predicted data value provided by a curve fitting process applied to a data tube with only one varying data dimension. Functions utilized with the curve fitting process can also be user selectable. Thus, the present invention allows a user to easily identify interesting characteristics of the data they are reviewing.

In FIG. 1, a block diagram of an automatic data perspective anomaly detection system 100 in accordance with an aspect of the present invention is shown. The automatic data perspective anomaly detection system 100 is comprised of an automatic data perspective anomaly detection component 102 that receives a data perspective 104 and automatically determines data anomalies 106. The data perspective can include, but is not limited to, spreadsheet pivot tables and OLAP cubes and the like. An optional external threshold input 108 can be utilized by the automatic data perspective anomaly detection component 102 to facilitate in determining what data is anomalous. A threshold value can also be determined as part of the automatic data perspective anomaly detection component 102 such as, for example, as a system determined value and/or a system determined percentage of deviation and the like. A plurality of user-specified thresholds can also be employed by the present invention to be utilized with different types of data anomalies. The automatic data perspective anomaly detection component 102 utilizes a curve fitting process applied to a data tube from a data perspective to determine which data is anomalous. The curve fitting process can also incorporate user-specified functions to facilitate the automatic detection of data anomalies.

Figure 2:
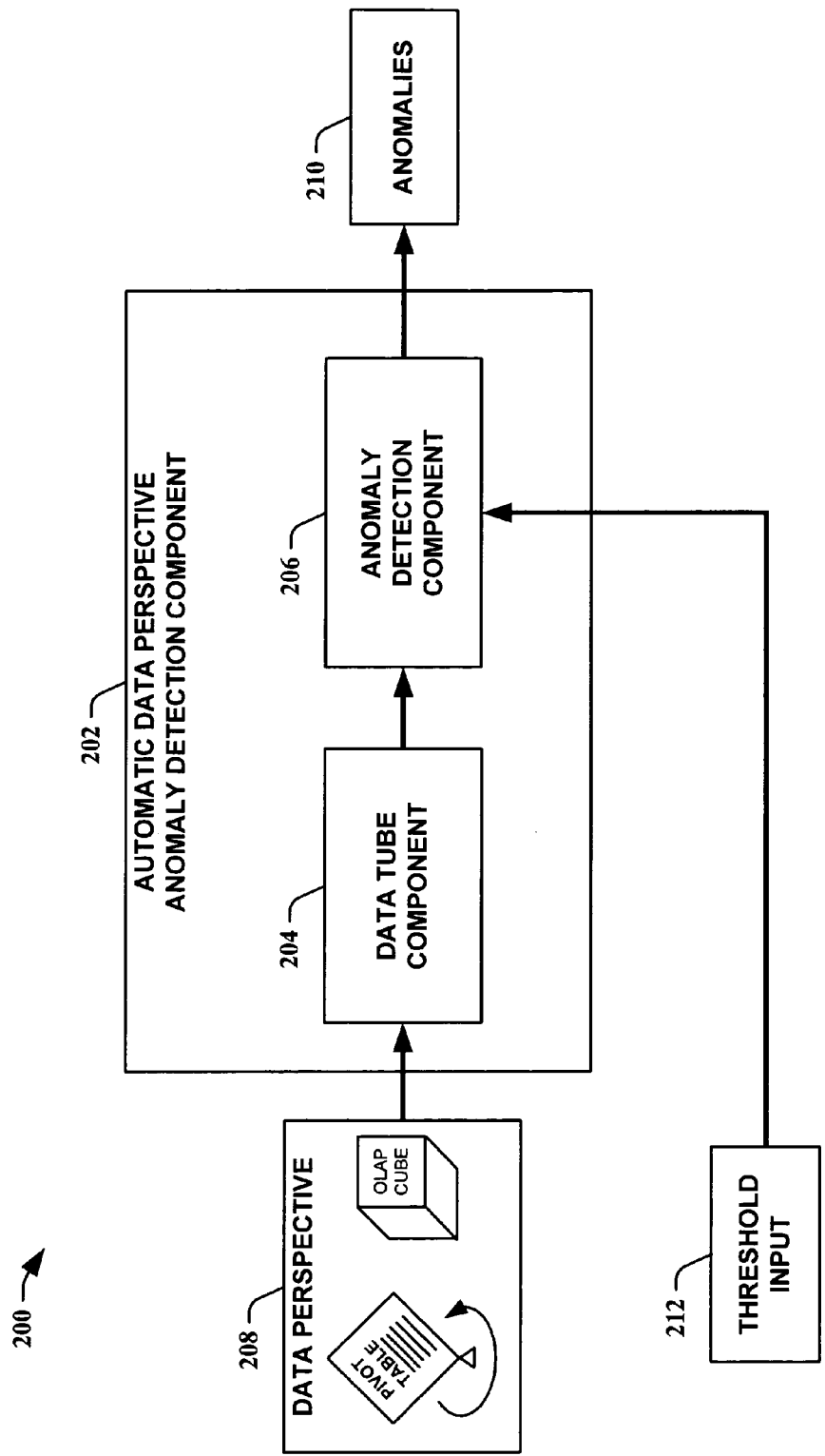
FIG. 2 is another block diagram of an automatic data perspective anomaly detection system in accordance with an aspect of the present invention.

Referring to FIG. 2, another block diagram of an automatic data perspective anomaly detection system 200 in accordance with an aspect of the present invention is depicted. The automatic data perspective anomaly detection system 200 is comprised of an automatic data perspective anomaly detection component 202 that is comprised of a data tube component 204 and an anomaly detection component 206. The data tube component 204 receives a data perspective 208 and processes the data perspective 208 into data tubes. The data tubes comprise slices of data from the data perspective 208 that have only one varying data dimension. The anomaly detection component 206 receives the data tubes and processes them utilizing a curve fitting process to determine any data anomalies. The curve fitting process is comprised of a process that attempts to produce a function that is capable of estimating data in a data tube. The estimated data becomes "predicted data" that is utilized to determine a deviation score for data in the data tube. A threshold input 212 is employed by the anomaly detection component 206 to determine what amount of deviation is acceptable. The threshold input 212 can be system generated and/or user generated. Any data that surpasses the threshold input 212 as determined by the anomaly detection component 206 are then output as anomalies 210.

Figure 3:
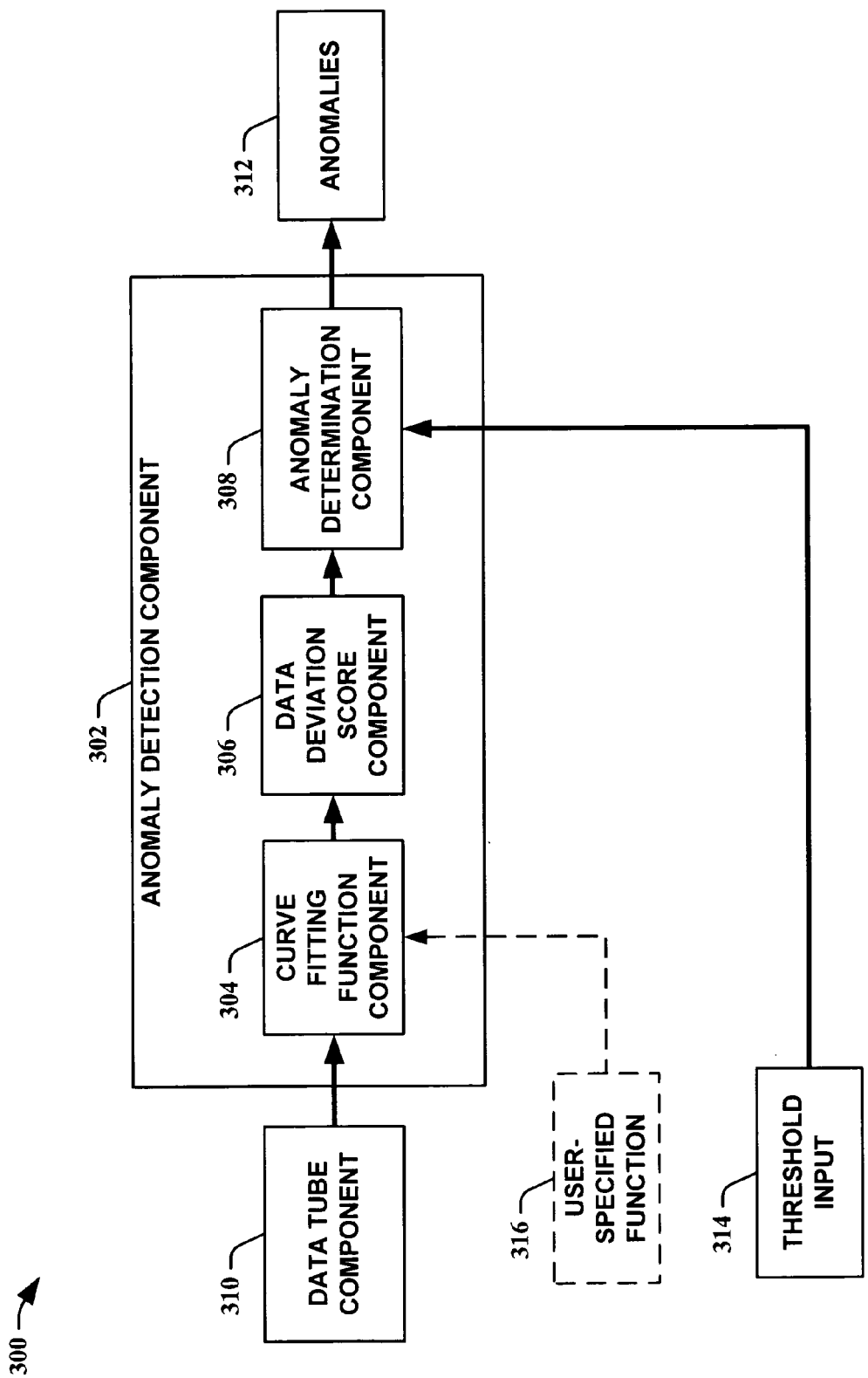
FIG. 3 is yet another block diagram of an automatic data perspective anomaly detection component in accordance with an aspect of the present invention.

Looking at FIG. 3, yet another block diagram of an automatic data perspective anomaly detection component 300 in accordance with an aspect of the present invention is illustrated. The automatic data perspective anomaly detection component 300 is comprised of a data tube component 310 and an anomaly detection component 302. The anomaly detection component 302 is comprised of a curve fitting function component 304, a data deviation score component 306, and an anomaly determination component 308. The curve fitting function component 304 receives a data tube from the data tube component 310 and determines an appropriate function to represent data from the data tube. This allows predicted data to be generated for data values from the data tube. The curve fitting function component 304 can also receive an optional user-specified function 316 to utilize as the appropriate function. This allows users to tailor the detection process. The data deviation score component 306 receives the data from the data tube along with the curve fitting function from the curve fitting function component 304. The data deviation score component 306 utilizes the curve fitting function to predict values for the data. These values are then compared to the actual data values and a score based on an amount of deviation from the predicted value is determined. The anomaly determination component 308 receives the deviation scores and utilizes a threshold input 314 to detect data that surpasses a threshold value. Data determined to be beyond the threshold is considered to be anomalous and is output as data anomalies 312.

In order to better appreciate the above systems, it is helpful to understand the context and meaning of the data. Data perspectives such as pivot tables and/or OLAP cubes are key tools for businesses. They allow a user to quickly and easily navigate large datasets, thereby facilitating business (and other) decisions. In essence, a data perspective such as a pivot table and OLAP cube are n-dimensional views of a data set. For example, a pivot table corresponding to the data shown in part in TABLE 1 is illustrated in TABLE 2.

TABLE 1

Raw Data

| date | prod cat | region | sales |
|------|----------|--------|-------|
| 1998 | cat1 | r1 | 39.45 |
| 1998 | cat1 | r2 | 37.51 |
| 1998 | cat1 | r3 | 35.71 |
| 1998 | cat2 | r1 | 36.77 |
| 1998 | cat2 | r2 | 37.56 |
| 1998 | cat2 | r3 | 35.09 |
| 1998 | cat3 | r1 | 38.77 |
| 1998 | cat3 | r2 | 36.50 |
| 1998 | cat3 | r3 | 38.84 |
| 1999 | cat1 | r1 | 36.85 |
| 1999 | cat1 | r2 | 35.84 |
| 1999 | cat1 | r3 | 38.40 |
| 1999 | cat2 | r1 | 49.13 |
| 1999 | cat2 | r2 | 45.92 |
| 1999 | cat2 | r3 | 45.47 |
| 1999 | cat3 | r1 | 37.31 |
| 1999 | cat3 | r2 | 39.10 |
| 1999 | cat3 | r3 | 36.26 |
| 2000 | cat1 | r1 | 38.58 |
| | etc. | | |

TABLE 2

Data Perspective Format

| | region | | (All) | | | | |
|---|---|---|---|---|---|---|---|
| Average of | | | date | | | | |
| sales prod cat | 1998 | 1999 | 2000 | 2001 | 2002 | 2003 | Grand Total |
| cat1 | 37.56 | 37.03 | 37.23 | 38.36 | 37.62 | 37.08 | 37.48 |
| cat2 | 36.47 | 46.84 | 38.15 | 37.43 | 36.51 | 38.20 | 38.93 |
| cat3 | 38.04 | 37.56 | 36.17 | 37.81 | 37.65 | 37.15 | 37.39 |
| Grand Total | 37.36 | 40.48 | 37.18 | 37.86 | 37.26 | 37.47 | 37.94 |

In this data perspective, average sales as a function of date and "prod cat" (product category) are shown; and sales is averaged over region (sales region). In this example, "sales" is the target while "date" and "prod cat" are displayed dimensions, and "region" is an aggregated dimension. In TABLE 2, the aggregation is average, but other aggregations (e.g., sum, min, and max) are possible. Other data perspectives of the same data set are possible—for example, sales as a function of date and region averaged over prod cat. The number of displayed dimensions may be greater than two (see TABLE 4).

Each dimension may have a hierarchy. In this example, the date hierarchy is year, quarter, week; the product hierarchy is prod cat, product; and the location hierarchy is region, state. An important part of a data perspective such as a pivot table is the level of hierarchy to be displayed. In TABLE 2, the levels displayed are year for the date dimension, prod cat for product dimension, and region for the location dimension. Users may drill down into a (displayed) dimension. This corresponds to a move to the next lower level in that dimension's hierarchy (see TABLE 5). Users may also drill across a given pivot by expanding it according to a dimension not currently in the pivot table. For example, TABLE 4 shows the result of a drill across by region of the pivot table in TABLE 2.

A pivot table also has a page field containing dimensions (as some level in their hierarchy) that select the data to be shown. In TABLE 2, the page field contains the location dimension at the level of region. Sales across all regions is selected. Alternatively, a user might select sales for a specific region or state. In general, a pivot table of a dataset corresponds to (1) a target, (2) displayed dimensions at some level of the hierarchy, (3) page field dimensions at some level of the hierarchy, and (4) an aggregation function.

Typically, one or more cells in a data perspective such as, for example, a pivot table may be anomalous. The present invention automatically detects and displays at least three types of cell anomalies such as, for example, (1) on-screen anomalies, (2) drill across anomalies, and (3) drill down anomalies and the like. A cell is on-screen anomalous if it is anomalous in the context of the other data displayed on the screen. A cell is drill across anomalous if drilling across that cell reveals an anomaly. A cell is drill down anomalous if drilling into that cell reveals an anomaly. These types of anomalies are shown in TABLE 3 (identical to TABLE 2 except for formatting).

TABLE 3

Data Perspective Anomalies region (All)
Average of sales

| prod cat | 1998 | 1999 | 2000 | 2001 | 2002 | 2003 | Grand Total |
|---|---|---|---|---|---|---|---|
| cat1 | 37.56 | 37.03 | 37.23 | 38.36 | 37.62 | 37.08 | 37.48 |
| cat2 | 36.47 | | 38.15 | 37.43 | 36.51 | 38.20 | 38.93 |
| cat3 | 38.04 | 37.56 | 36.17 | 37.81 | 37.65 | 37.15 | 37.39 |
| Grand Total | 37.36 | 40.48 | 37.18 | 37.86 | 37.26 | 37.47 | 37.94 |

In TABLE 3, cell cat2/1999 is on-screen anomalous, because the cell has a higher sales average than any other cell in its row or columns. Cell cat2/2001 in TABLE 3 is drill across anomalous. The anomaly is not apparent until a user drills across the data perspective by region as illustrated in TABLE 4 below.

TABLE 4

Drill Across Anomaly

Average of sales / date

| prod cat | region | 1998 | 1999 | 2000 | 2001 | 2002 | 2003 | Grand Total |
|---|---|---|---|---|---|---|---|---|
| cat1 | r1 | 39.45 | 36.85 | 38.58 | 39.70 | 35.47 | 35.58 | 37.61 |
| | r2 | 37.51 | 35.84 | 36.54 | 36.36 | 38.32 | 39.63 | 37.37 |
| | r3 | 35.71 | 38.40 | 36.59 | 39.01 | 39.05 | 36.01 | 37.46 |
| cat1 Total | | 37.56 | 37.03 | 37.23 | 38.36 | 37.62 | 37.08 | 37.48 |
| cat2 | r1 | 36.77 | 49.13 | 39.10 | 44.65 | 36.95 | 37.55 | 40.69 |
| | r2 | 37.56 | 45.92 | 36.87 | 42.04 | 37.49 | 37.40 | 39.55 |
| | r3 | 35.09 | 45.47 | 38.46 | 25.58 | 35.09 | 39.64 | 36.55 |
| cat2 Total | | 36.47 | 46.84 | 38.15 | 37.43 | 36.51 | 38.20 | 38.93 |
| cat3 | r1 | 38.77 | 37.31 | 37.96 | 37.07 | 37.09 | 39.46 | 37.94 |
| | r2 | 36.50 | 39.10 | 35.22 | 38.61 | 37.35 | 36.69 | 37.25 |
| | r3 | 38.84 | 36.26 | 35.35 | 37.74 | 38.50 | 35.29 | 37.00 |
| cat3 Total | | 38.04 | 37.56 | 36.17 | 37.81 | 37.65 | 37.15 | 37.39 |
| Grand Total | | 37.36 | 40.48 | 37.18 | 37.86 | 37.26 | 37.47 | 37.94 |

In TABLE 4, sales in r3 are shown significantly lower than those in r1 and r2. Additionally, cell cat3/2002 in TABLE 3 is drill down anomalous. Again, the anomaly is not apparent until a user drills down the product hierarchy as shown in TABLE 5 below.

TABLE 5

Drill Down Anomaly region (All)
Average of sales / date

| prod cat | 1998 | 1999 | 2000 | 2001 | 2002 | 2003 | Grand Total |
|---|---|---|---|---|---|---|---|
| cat1 | 37.56 | 37.03 | 37.23 | 38.36 | 37.62 | 37.08 | 37.48 |
| cat2 | 36.47 | 46.84 | 38.15 | 37.43 | 36.51 | 38.20 | 38.93 |
| cat3 | 38.04 | 37.56 | 36.17 | 37.81 | 37.65 | 37.15 | 37.39 |
| prod1 | | | | | 42.87 | | 42.87 |
| prod2 | | | | | 43.48 | | 43.48 |
| prod3 | | | | | 26.59 | | 26.59 |
| Grand Total | 37.36 | 40.48 | 37.18 | 37.86 | 37.45 | 37.47 | 37.89 |

In TABLE 5, sales of prod3 are shown much lower than those of prod1 and prod2. In these examples, on-screen anomalies have been highlighted, and drill across and drill down anomalies have been indicated with a border. However, one skilled in the art will appreciate that many other variations are possible.

An example of automatic anomaly detection by the present invention follows. The term tube is utilized to refer to a slice of a given data perspective in which only one dimension varies. In a 2-dimensional data perspective, a tube simply corresponds to a row and/or a column. Some example tubes are shown in the 3-dimensional pivot table of TABLE 4 which corresponds to (1) varying prod cat with date and region fixed, (2) varying region with prod cat and date fixed, and (3) varying date with prod cat and region fixed.

A cell is anomalous with respect to a tube if it deviates significantly from the expected value for that cell as calculated by a curve fitting function. Rather than require that values in a data perspective are continuous, it is assumed that the data perspective is one dimensional and has an index that is ordered. For example, the data perspective could be one that is indexed by time, distance, or money. Thus, the values of the data perspective can be continuous and/or discrete. A curve fitting method can then be applied to that perspective for anomaly detection, such as, for example, an "auto-regressive" curve fitting method. In one instance of the present invention, anomaly detection can be facilitated by assigning a deviation score for the amount of deviation from an expected value. The deviation score can then be compared to a given threshold to determine if an anomaly exists. For example, with discrete data, the probability of observed values in a data perspective is determined. If the probabilities are substantially low, the data is considered anomalous.

In another instance of the present invention, continuous dimension data in a tube is fit to a piece-wise linear function (utilizing, e.g., a regression tree and the like). A cell is then anomalous if:

$$|\text{value in cell} - \text{predicted value for cell}| > \text{threshold} \qquad (\text{Eq. 1})$$

where the left-hand-side of this equation is the deviation score for the cell.

In yet another instance of the present invention, discrete dimension data in a tube is fit to an auto-regressive model. A cell is then anomalous if the probability of the value in the cell is less than some threshold.

As apparent from above, the present invention applies different curve-fitting functions for continuous data and discrete data. There are, however, multiple ways to determine whether a dimension is discrete or continuous. For example, a user can specify a choice (e.g., labeling the dimension a "number" via a format command and the like). Or, as a further example, the choice can be made automatically by examining the data (e.g., utilizing systems and methods such as those described in U.S. patent application Ser. No. 09/298,737, filed by Heckerman, et al. on Apr. 23, 1999 entitled Determining Whether A Variable Is Numeric Or Non-Numeric).

The three types of anomalies for this example are now defined for a given data perspective such as a pivot table. A cell is on-screen anomalous if it is anomalous with respect to any of the tubes displayed. Other definitions can include, but are not limited to, (1) a cell is on-screen anomalous if it is anomalous with respect to all of the tubes displayed, and (2) a cell is on-screen anomalous if the degree of deviation averaged along all tubes on-screen exceeds a threshold. A cell is a drill across anomalous if there is an anomalous tube that varies across a non-displayed dimension (with the displayed dimensions held fixed). A cell is a drill down anomalous if there is an anomalous tube that varies across a currently displayed dimension drilled down to a deeper level (with all other displayed dimensions held fixed).

Drill across and drill down anomalies are, by definition, not visible to a user. A mechanism to expose them is to allow the user to see which dimensions and/or hierarchies need to be expanded to see the anomalies. In some data perspective applications, this can be done via a right click from a pointing device (e.g., mouse) on the anomalous cell. In addition to indicating which dimension and/or hierarchies contain anomalies, the degree of the anomalies can be indicated as well—for example, by sorting the dimensions and hierarchies according to their corresponding deviation score.

As for on-screen anomalies, a user may desire an explanation as for why a cell is anomalous. This is achieved via the present invention by displaying (e.g., highlighting) the tubes whose deviation scores exceed a threshold. This function can also be employed by utilizing a right click of a pointing device (e.g., mouse) in some applications.

For thresholds, there are two cases to consider. One, the cell in question can be drilled into and/or drilled across, and/or there are multiple entries for the same cell in the original data. In this case, the threshold $c\sigma$ can be utilized, where c is a user-controlled constant, and $\sigma$ is the standard deviation of the data resulting from one or more expansions of the cell. Two, if a cell cannot be expanded or as an alternative to the threshold described, c<predicted value> or simply c as the threshold can be employed, where again c is a user-controlled constant. Alternatively, a top k anomalies can be shown, where k is chosen by a user. Alternatively, any cell that cannot be expanded can be selected to not be labeled.

Figure 4:
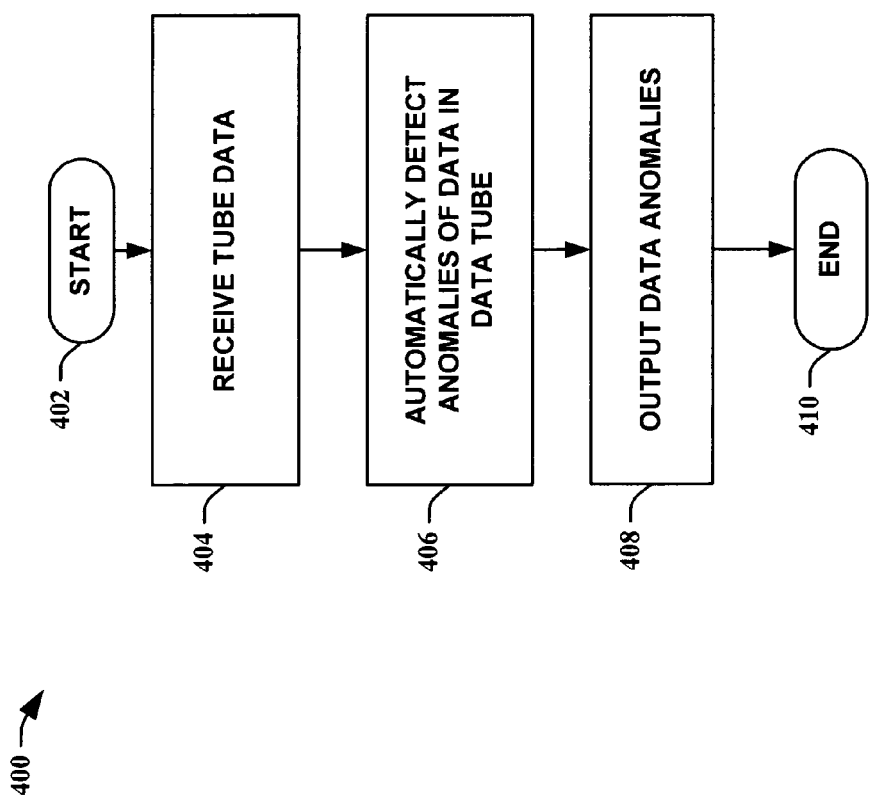
FIG. 4 is a flow diagram of a method of facilitating automatic data perspective anomaly detection in accordance with an aspect of the present invention.
Figure 5:
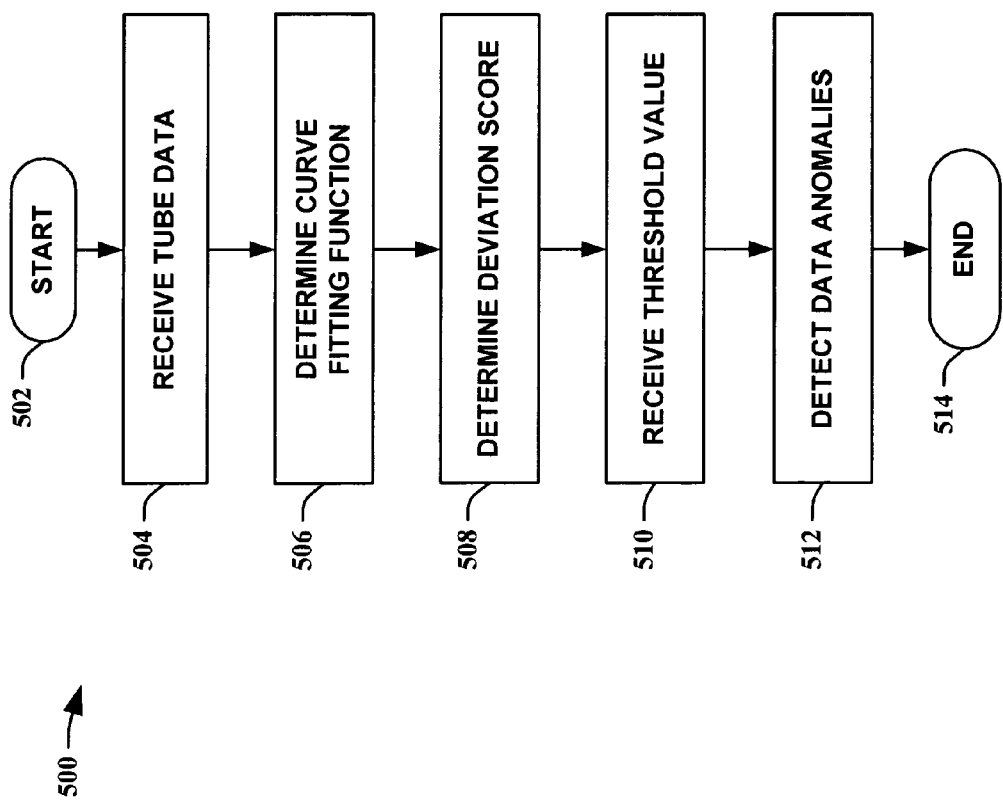
FIG. 5 is another flow diagram of a method of facilitating automatic data perspective anomaly detection in accordance with an aspect of the present invention.

In view of the exemplary systems shown and described above, methodologies that may be implemented in accordance with the present invention will be better appreciated with reference to the flow charts of FIGS. 4–5. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

In FIG. 4, a flow diagram of a method 400 of facilitating automatic data perspective anomaly detection in accordance with an aspect of the present invention is shown. The method 400 starts 402 by receiving tube data representative of a slice of data from a data perspective where only one dimension varies 404. Anomalies in the data are then automatically detected utilizing a curve fitting function applied to the data 406. The curve fitting function can be derived and/or user-specified. The anomaly detection can be further facilitated by threshold deviation values supplied by a system and/or a user. The threshold deviation values can also vary depending on a type of data anomaly. The detected anomalies are then output as data anomalies 408, ending the flow 410.

Referring to FIG. 5, another flow diagram of a method 500 of facilitating automatic data perspective anomaly detection in accordance with an aspect of the present invention is depicted. The method 500 starts by receiving tube data representative of a slice of data from a data perspective where only one dimension varies 504. A determination is then made as to what function best represents the data of the data tube 506. The function can be obtained through auto-regression processes such as piece-wise linear processes and regression tree processes for continuous and discrete data. The function can also be obtained as a user-provided function. Deviation scores are then determined based on the predicted value of the data given the curve fitting function and the actual data values 508. A threshold value is then received which determines the amount of deviation allowed before a data value is considered erroneous 510. The threshold value can be determined via a system and/or provided by a user. It can be a static value and/or a dynamic value. The threshold value can also vary depending on the type of data anomaly. The data anomalies are then detected by determining which data values possess deviation scores that surpass the threshold value 512, ending the flow 514. Typically, the data anomalies are relayed to a user via on-screen indicators such as highlighting, outlining, and/or color coding and the like. However, icons and other graphical indicators can be utilized as well. The indicators allow a user to assess what level the data anomaly can be found at. They also can be utilized to indicate a type of data anomaly and/or a degree of deviation of the data anomaly. Other instances of the present invention include further operations to automatically display a data anomaly to a user without requiring further user input to view the actual anomalous data. This drastically reduces data dissemination to the user because it does not require that the user know and understand all data level indicators to reach and view the data anomaly.

Figure 6:
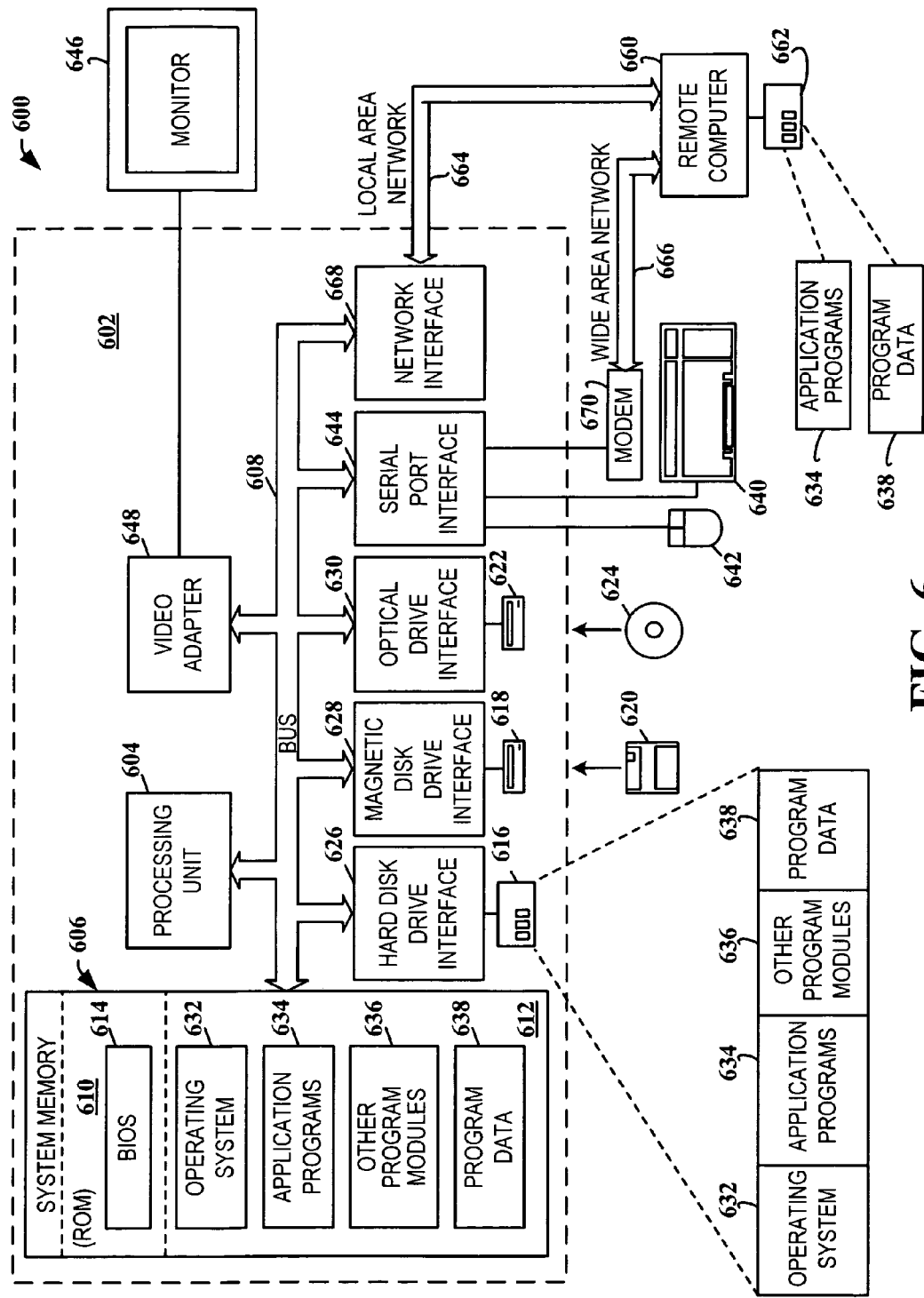
FIG. 6 illustrates an example operating environment in which the present invention can function.

In order to provide additional context for implementing various aspects of the present invention, FIG. 6 and the following discussion are intended to provide a brief, general description of a suitable computing environment 600 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 6, an exemplary system environment 600 for implementing the various aspects of the invention includes a conventional computer 602, including a processing unit 604, a system memory 606, and a system bus 608 that couples various system components, including the system memory, to the processing unit 604. The processing unit 604 may be any commercially available or proprietary processor. In addition, the processing unit may be implemented as multi-processor formed of more than one processor, such as may be connected in parallel.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system memory 606 includes read only memory (ROM) 610 and random access memory (RAM) 612. A basic input/output system (BIOS) 614, containing the basic routines that help to transfer information between elements within the computer 602, such as during start-up, is stored in ROM 610.

The computer 602 also may include, for example, a hard disk drive 616, a magnetic disk drive 618, e.g., to read from or write to a removable disk 620, and an optical disk drive 622, e.g., for reading from or writing to a CD-ROM disk 624 or other optical media. The hard disk drive 616, magnetic disk drive 618, and optical disk drive 622 are connected to the system bus 608 by a hard disk drive interface 626, a magnetic disk drive interface 628, and an optical drive interface 630, respectively. The drives 616–622 and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 600, and further that any such media may contain computer-executable instructions for performing the methods of the present invention.

A number of program modules may be stored in the drives 616–622 and RAM 612, including an operating system 632, one or more application programs 634, other program modules 636, and program data 638. The operating system 632 may be any suitable operating system or combination of operating systems. By way of example, the application programs 634 can include a data perspective analysis scheme in accordance with an aspect of the present invention.

A user can enter commands and information into the computer 602 through one or more user input devices, such as a keyboard 640 and a pointing device (e.g., a mouse 642). Other input devices (not shown) may include a microphone, a joystick, a game pad, a satellite dish, wireless remote, a scanner, or the like. These and other input devices are often connected to the processing unit 604 through a serial port interface 644 that is coupled to the system bus 608, but may be connected by other interfaces, such as a parallel port, a game port or a universal serial bus (USB). A monitor 646 or other type of display device is also connected to the system bus 608 via an interface, such as a video adapter 648. In addition to the monitor 646, the computer 602 may include other peripheral output devices (not shown), such as speakers, printers, etc.

It is to be appreciated that the computer 602 can operate in a networked environment using logical connections to one or more remote computers 660. The remote computer 660 may be a workstation, a server computer, a router, a peer device or other common network node, and typically includes many or all of the elements described relative to the computer 602, although for purposes of brevity, only a memory storage device 662 is illustrated in FIG. 6. The logical connections depicted in FIG. 6 can include a local area network (LAN) 664 and a wide area network (WAN) 666. Such networking environments are commonplace in offices, enterprise-wide computer networks, intranets and the Internet.

When used in a LAN networking environment, for example, the computer 602 is connected to the local network 664 through a network interface or adapter 668. When used in a WAN networking environment, the computer 602 typically includes a modem (e.g., telephone, DSL, cable, etc.) 670, or is connected to a communications server on the LAN, or has other means for establishing communications over the WAN 666, such as the Internet. The modem 670, which can be internal or external relative to the computer 602, is connected to the system bus 608 via the serial port interface 644. In a networked environment, program modules (including application programs 634) and/or program data 638 can be stored in the remote memory storage device 662. It will be appreciated that the network connections shown are exemplary and other means (e.g., wired or wireless) of establishing a communications link between the computers 602 and 660 can be used when carrying out an aspect of the present invention.

In accordance with the practices of persons skilled in the art of computer programming, the present invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 616, floppy disks 620, CD-ROM 624, and remote memory 662) to thereby reconfigure or otherwise alter the computer system's operation, as well as other processing of signals. The memory locations where such data bits are maintained are physical locations that have particular electrical, magnetic, or optical properties corresponding to the data bits.

Figure 7:
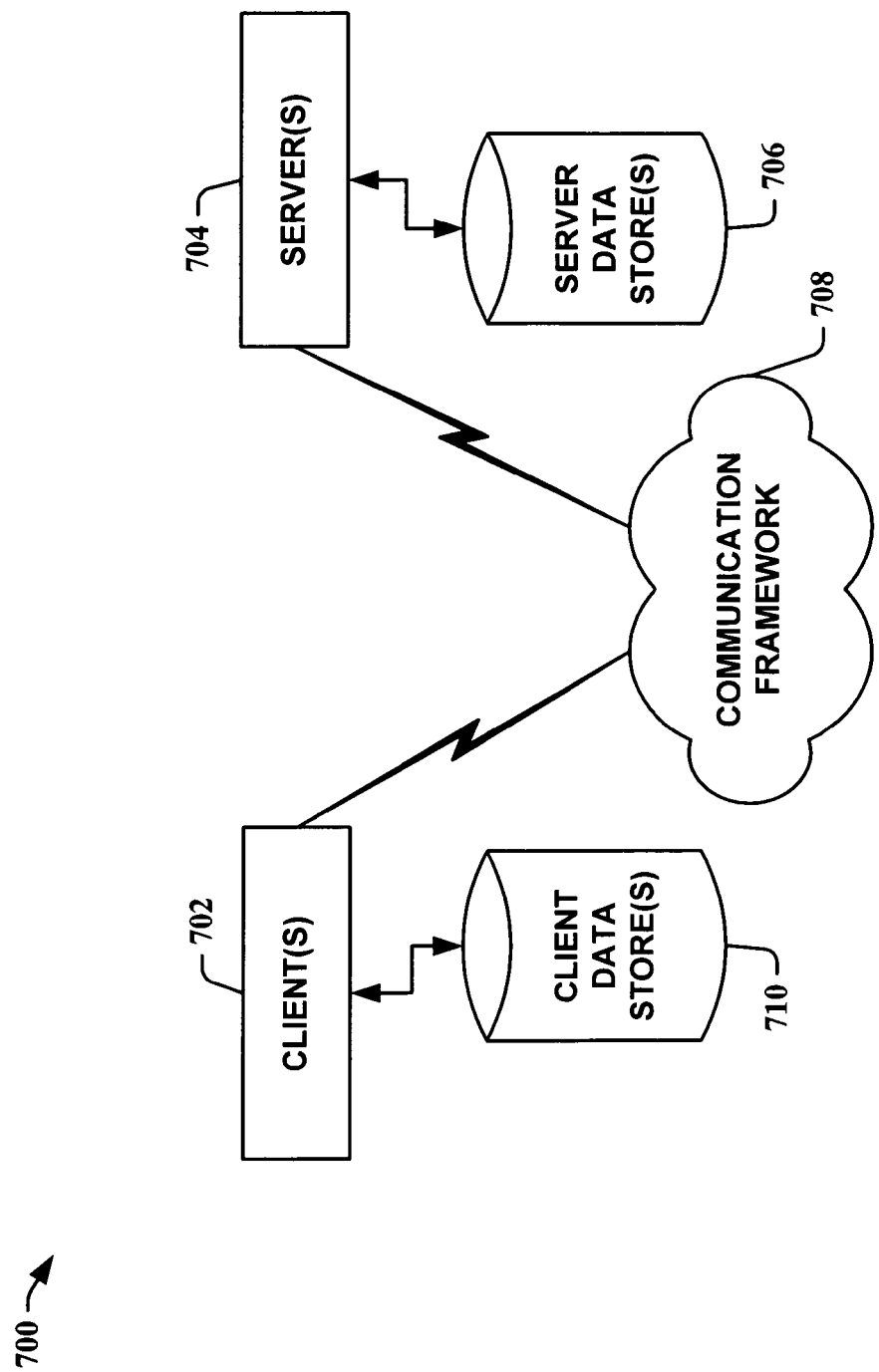
FIG. 7 illustrates another example operating environment in which the present invention can function.

FIG. 7 is another block diagram of a sample computing environment 700 with which the present invention can interact. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). The servers 704 can house threads to perform transformations by employing the present invention, for example. One possible communication between a client 702 and a server 704 may be in the form of a data packet adapted to be transmitted between two or more computer processes. The system 700 includes a communication framework 708 that can be employed to facilitate communications between the client(s) 702 and the server(s) 704. The client(s) 702 are operably connected to one or more client data store(s) 710 that can be employed to store information local to the client(s) 702. Similarly, the server(s) 704 are operably connected to one or more server data store(s) 706 that can be employed to store information local to the server 704.

In one instance of the present invention, a data packet is transmitted between two or more computer components that facilitates data perspective analysis, the data packet comprised of, at least in part, information relating to a data perspective analysis system that utilizes, at least in part, a curve fitting process applied to data from a data tube; the data tube comprising a data slice that includes at least one data cell of a data perspective in which only one data dimension varies It is to be appreciated that the systems and/or methods of the present invention can be utilized in a data perspective analysis scheme for facilitating computer components and non-computer related components alike. Further, those skilled in the art will recognize that the systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic data perspective anomaly detection system:
   a data tube component that receives at least one data perspective and processes the at least one data perspective into at least one data tube; and
   an anomaly detection component that receives and processes the at least one data tube utilizing a curve fitting process to determine any data anomalies, the curve fitting process approximates a function capable of estimating data in the data tube, the estimated data employed as predicted data to determine a deviation score for data in the data tube.

2. The system of claim 1, the at least one data tube comprises a slice of data from the data perspective having only one varying data dimension.

3. The system of claim 1, the anomaly detection component comprises a threshold input to determine an acceptable amount of deviation, data determined to surpass the threshold input are output as anomalies.

4. The system of claim 1, the at least one data perspective selected from n-dimensional views of a data set wherein n=1, 2 or 3.

5. The system of claim 1, the function employed is a piece-wise linear function applied to the data tube.

6. An automatic data perspective anomaly detection component comprising:
   a data tube component for generating a plurality of data tubes;
   an anomaly detection component comprising a curve fitting function component that receives a data tube from the data tube component to determine a suitable curve fitting function to represent data from the data tube;
   a data deviation score component that utilizes the curve fitting function to: derive predicted values for the data from the data tube; compare the predicted values to actual values for data in the data tubes; and determine deviation scores based on an amount of deviation from the predicted value; and
   an anomaly determination component that receives the deviation scores and utilizes a threshold input to detect anomalous data that surpasses a threshold value.

7. The component of claim 6, the curve fitting function component receives the data tube from the data tube component and automatically determines an appropriate function to represent data from the data tube.

8. The component of claim 6, the curve fitting function component receives an optional user-specified function to utilize as an appropriate function.

9. The component of claim 6, the date tube component generates the data tube from data perspectives.

10. The component of claim 9, the data perspectives are selected from n-dimensional views of a data set wherein n=1, 2 or 3.

11. The component of claim 10, the data perspectives are selected from at least one of pivot tables and OLAP cubes.

12. The component of claim 10, the data in the data tube is continuous dimension data fit to a piece-wise linear function.

13. The component of claim 6, data is determined to be anomalous if a difference between an actual value and a predicted value is greater than the threshold.

14. A method of facilitating automatic data perspective anomaly detection comprising:

receiving tube data representative of a slice of data from a data perspective where only one dimension varies;

applying a curve fitting function to the data to automatically detect anomalies in the tube data, the curve fitting function provides an estimate of the tube data, the estimate employed as predicted data to determine a deviation score for the tube data; and displaying the anomalies on an interface component.

15. The method of claim 14, the curve fitting function being at least one of: derived and user-specified.

16. The method of claim 14, facilitating anomaly detection by using threshold deviation values supplied by at least one of a system and a user.

17. The method of claim 16, the curve fitting function is determined through one of an auto-regression process and a user-provided function.

18. The method of claim 17, a deviation score is determined based on a predicted value of the data given the curve fitting function and the actual data values.

19. The method of claim 18, the deviation score comprises a threshold value for determining the amount of deviation allowed before a data value is considered erroneous.

20. The method of claim 19, the threshold value being one of a static and dynamic value determined by at least one of a system and a user.

* * * * *